(12) United States Patent
Szymanski et al.

(10) Patent No.: US 7,888,436 B2
(45) Date of Patent: Feb. 15, 2011

(54) COMPOSITIONS COMPRISING THIOETHER-FUNCTIONAL OLIGOMERIC POLYTHIOLS

(75) Inventors: Chester J. Szymanski, Allison Park, PA (US); Lawrence G. Anderson, Allison Park, PA (US); Gregory J. McCollum, Gibsonia, PA (US); Nina V. Bojkova, Monroeville, PA (US)

(73) Assignee: PRC DeSoto International, Inc., Glendale, CA (US)

( * ) Notice: Subject to any disclaimer, the term of this patent is extended or adjusted under 35 U.S.C. 154(b) by 441 days.

(21) Appl. No.: 11/744,266

(22) Filed: May 4, 2007

(65) Prior Publication Data

US 2007/0270549 A1 Nov. 22, 2007

Related U.S. Application Data

(60) Provisional application No. 60/797,985, filed on May 5, 2006.

(51) Int. Cl.
*C08G 59/14* (2006.01)
*C08L 63/00* (2006.01)

(52) U.S. Cl. .................... 525/524; 525/50; 525/523

(58) Field of Classification Search ............... 525/524, 525/123
See application file for complete search history.

(56) References Cited

U.S. PATENT DOCUMENTS

| | | | |
|---|---|---|---|
| 3,454,539 A | 7/1969 | Greenlee | |
| 3,592,798 A * | 7/1971 | Oswald | 528/374 |
| 3,661,744 A | 5/1972 | Kehr | |
| 3,662,023 A | 5/1972 | Kehr | |
| 3,714,290 A | 1/1973 | Kehr | |
| 3,725,229 A | 4/1973 | Kehr | |
| 3,729,403 A * | 4/1973 | Kehr | 522/97 |
| 3,872,150 A | 3/1975 | Kehr | |
| 3,872,151 A | 3/1975 | Kehr | |
| 3,872,152 A | 3/1975 | Kehr | |
| 3,898,349 A | 8/1975 | Kehr | |
| 3,931,287 A | 1/1976 | Kehr | |
| 3,954,723 A | 5/1976 | Oswald | |
| 4,046,729 A | 9/1977 | Scriven | |
| 4,366,307 A | 12/1982 | Singh | |
| 4,609,762 A | 9/1986 | Morris | |
| 5,225,472 A | 7/1993 | Cameron | |
| 5,912,319 A | 6/1999 | Zook | |
| 6,172,179 B1 | 1/2001 | Zook | |
| 6,232,401 B1 | 5/2001 | Zook | |
| 6,372,849 B2 | 4/2002 | DeMoss | |
| 6,509,418 B1 * | 1/2003 | Zook et al. | 525/212 |
| 2003/0017341 A1 | 1/2003 | Gross | |
| 2005/0010003 A1 | 1/2005 | Sawant | |
| 2006/0241273 A1 | 10/2006 | Bojkova | |

FOREIGN PATENT DOCUMENTS

| | | | |
|---|---|---|---|
| EP | 0056006 | | 7/1982 |
| EP | 1211276 | | 6/2002 |
| JP | 62232424 A | * | 10/1987 |
| WO | 2004060951 | | 7/2004 |

OTHER PUBLICATIONS

Marvel et al., Polyalkylene Sulfides from Diolefins and Dimercaptans, 1948, Journal of the American Chemical Society, vol. 70, p. 993-998.*
English translation of JP 62232424 A, Takiyama et al, Oct. 12, 1987.*

* cited by examiner

*Primary Examiner*—Mark Eashoo
*Assistant Examiner*—David Karst
(74) *Attorney, Agent, or Firm*—Diane R. Meyers; Lauren E. Schneider

(57) ABSTRACT

Sealant and potting formulations comprising a thioether-functional, oligomeric polythiol prepared by reacting together:
(a) a compound having at least two thiol functional groups; and
(b) a compound having triple bond functionality
are disclosed.

16 Claims, No Drawings

COMPOSITIONS COMPRISING THIOETHER-FUNCTIONAL OLIGOMERIC POLYTHIOLS

CROSS REFERENCE TO RELATED APPLICATIONS

This application claims priority to U.S. Provisional Patent Application No. 60/797,985 filed May 5, 2006.

FIELD OF THE INVENTION

The present invention relates to compositions comprising thioether-functional oligomeric polythiols.

BACKGROUND OF THE INVENTION

Commercially available polymeric materials that have sufficient sulfur content to exhibit desirable sealing and fuel resistance properties for aerospace sealants and electrical potting compounds include the polysulfide polyformal polymers described, e.g., in U.S. Pat. No. 2,466,963, and the alkyl side chain containing polythioether polyether polymers described, e.g., in U.S. Pat. No. 4,366,307 to Singh et al. Materials useful in this context also have the desirable properties of low temperature flexibility characterized by a low glass transition temperature ($T_g$) and liquidity at room temperature.

Another desirable feature in polymers suitable for use in aerospace sealants is high temperature resistance. While incorporating sulfur to carbon bonds into a polymer generally enhances high temperature performance, —S—S— linkages in the polymer backbones can result in compromised thermal resistance.

There exists a need in the art for compositions, particularly those used in the aerospace industry such as sealants and electrical potting formulations, that may provide good pot life as well as good performance properties, such as fuel resistance, flexural strength, thermal resistance and/or longevity in use.

SUMMARY OF THE INVENTION

The present invention is directed to a sealant formation comprising
1) the thioether-functional oligomeric polythiol reaction product of
   (a) a compound having at least two thiol functional groups; and
   (b) a compound having triple bond functionality;
2) a curing agent reactive with the thioether-functional oligomeric polythiol; and
3) a filler, an adhesion promoter, a plasticizer and/or a catalyst.

DETAILED DESCRIPTION OF THE INVENTION

The present invention is directed to a sealant formulation comprising
1) the thioether-functional oligomeric polythiol reaction product of
   (a) a compound having at least two thiol functional groups; and
   (b) a compound having triple bond functionality;
2) a curing agent reactive with the thioether-functional oligomeric polythiol; and
3) a filler, an adhesion promoter, a plasticizer and/or a catalyst.

The present invention is further directed to an electrical potting formulation comprising
1) the thioether-functional oligomeric polythiol reaction product of
   (a) a compound having at least two thiol functional groups; and
   (b) a compound having triple bond functionality;
2) a curing agent reactive with the thioether-functional oligomeric polythiol; and
3) a filler, an adhesion promoter, a plasticizer and/or a catalyst.

The terms "oligomer", "oligomeric" and the like are intended to refer to compounds prepared by addition polymerization to yield a material having repeating units and having a number average molecular weight (Mn) up to 5000, such as up to 2000, such as 200 to 1200. The number average molecular weight may be determined by gel permeation chromatography using a polystyrene standard. The terms "sealant", "sealant formulation", "sealant composition" and the like are used interchangeably herein as are "potting formulation", "electrical potting formulation" and the like. "Compositions of the present invention", "the present compositions" and like terms refer to both the sealant formulation and the electrical potting formulation.

In certain embodiments, the compound having triple bond functionality will be a hydroxyl functional compound, and the thioether-functional, oligomeric polythiol will have pendant hydroxyl functional groups.

The compound (a) having at least two thiol functional groups may comprise, for example, a polythiol or mixture thereof. A "polythiol" as used herein refers to a dithiol or a higher polythiol. In certain embodiments, the polythiol comprises dithiol, and in certain embodiments the polythiol comprises a mixture of a dithiol and another compound having more than two thiol functional groups (higher polythiol). Such mixtures may include mixtures of dithiols and/or mixtures of higher polythiols. The thiol functional groups (—SH groups) are typically terminal groups, though a minor portion (such as less than 50%, or less than 25%, of all thiol groups) may be pendant along a chain. The compound (a) may additionally contain a minor portion (such as less than 50%, or less than 25%, of all functional groups) of other active hydrogen functionality (that is, different from thiol), for example, hydroxyl functionality. The compound (a) may be linear or branched, and may contain cyclic, alkyl, aryl, aralkyl, or alkaryl groups.

The compound (a) can be selected so as to produce a substantially linear oligomeric polythiol. Therefore, when compound (a) comprises a mixture of a dithiol and a compound having more than two thiol functional groups, the compound having more than two thiol functional groups can be present in an amount that will maintain the linear nature of the polymer, such as up to 10 percent by weight of the mixture.

Suitable dithiols can include linear or branched aliphatic, cycloaliphatic, aromatic, heterocyclic, polymeric, oligomeric dithiols and mixtures thereof. The dithiol can comprise a variety of linkages including but not limited to ether linkages (—O—), sulfide linkages (—S—), polysulfide linkages (—$S_x$—, wherein x is at least 2, such as from 2 to 4) and combinations of such linkages.

Non-limiting examples of suitable dithiols for use in the present invention can include but are not limited to 2,5-dimercaptomethyl-1,4-dithiane, dimercaptodiethylsulfide (DMDS), ethanedithiol, 3,6-dioxa-1,8-octanedithiol, ethylene glycol di(2-mercaptoacetate), ethylene glycol di(3-mercaptopropionate), poly(ethylene glycol)di(2-mercaptoacetate) and poly(ethylene glycol)di(3-mercaptopropionate), benzenedithiol, 4-tert-butyl-1,2-benzenedithiol, 4,4'-thiodibenzenethiol, and mixtures thereof.

The dithiol may include dithiol oligomers having disulfide linkages such as materials represented by the following graphic formula I:

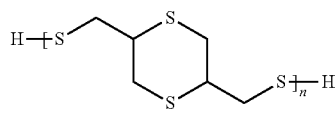

(I)

wherein n can represent an integer from 1 to 21.

Dithiol oligomers represented by Formula I can be prepared, for example, by the reaction of 2,5-dimercaptomethyl-1,4-dithiane with sulfur in the presence of basic catalyst, as known in the art.

The nature of the SH group in polythiols is such that oxidative coupling can occur readily, leading to formation of disulfide linkages (that is, —S—S— linkages). Various oxidizing agents can lead to such oxidative coupling. The oxygen in the air can in some cases lead to such oxidative coupling during storage of the polythiol. It is believed that a possible mechanism for the oxidative coupling of thiol groups involves the formation of thiyl radicals, followed by coupling of said thiyl radicals, to form disulfide linkage. It is further believed that formation of a disulfide linkage can occur under conditions that can lead to the formation of a thiyl radical, including but not limited to reaction conditions involving free radical initiation. The polythiols for use as compound (a) in the preparation of the polythiols of the present invention can include species containing disulfide linkages formed during storage.

The polythiols for use as compound (a) in the preparation of the oligomeric polythiols used in certain embodiments of the present invention also can include species containing disulfide linkages formed during synthesis of the polythiol.

In certain embodiments, the dithiol for use in the present invention can include at least one dithiol represented by the following graphic formulas:

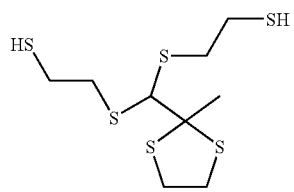

(II)

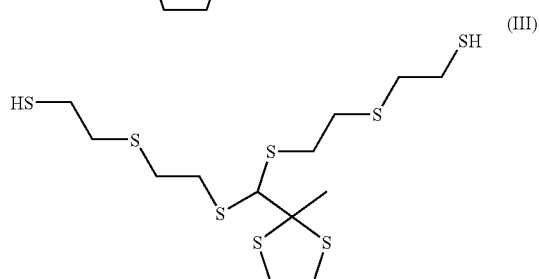

(III)

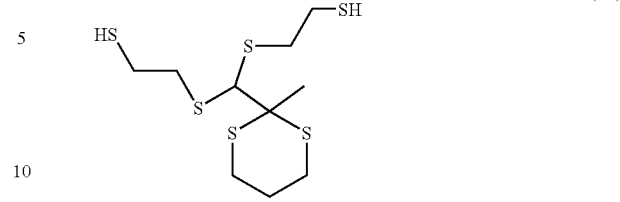

(IV)

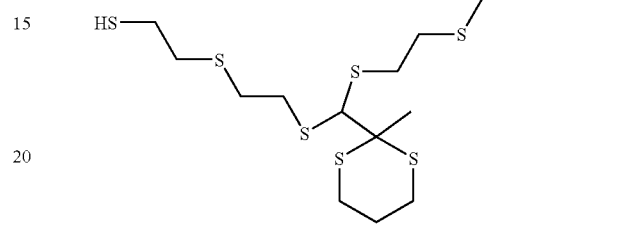

(V)

The sulfide-containing dithiols comprising 1,3-dithiolane (e.g., formulas II and III) or 1,3-dithiane (e.g., formulas IV and V) can be prepared by reacting asym-dichloroacetone with dimercaptan, and then reacting the reaction product with dimercaptoalkylsulfide, dimercaptan or mixtures thereof, as described in U.S. Pat. No. 7,009,032 B2.

Non-limiting examples of suitable dimercaptans for use in the reaction with asym-dichloroacetone include but are not limited to materials represented by the following formula VI:

(VI)

wherein Y can represent $CH_2$ or $(CH_2-S-CH_2)$, and n' can be an integer from 0 to 5. The dimercaptan for reaction with asym-dichloroacetone in the present invention can be chosen from, for example, ethanedithiol, propanedithiol, and mixtures thereof.

The amount of asym-dichloroacetone and dimercaptan suitable for carrying out the above reaction can vary. For example, asym-dichloroacetone and dimercaptan can be present in the reaction mixture in an amount such that the molar ratio of dichloroacetone to dimercaptan can be from 1:1 to 1:10.

Suitable temperatures for reacting asym-dichloroacetone with dimercaptan can vary, often ranging from 0 to 100° C.

Non-limiting examples of suitable dimercaptans for use in the reaction with the reaction product of the asym-dichloroacetone and dimercaptan can include but are not limited to materials represented by the above general formula VI, aromatic dimercaptans, cycloalkyl dimercaptans, heterocyclic dimercaptans, branched dimercaptans, and mixtures thereof.

Non-limiting examples of suitable dimercaptoalkylsulfides for use in the reaction with the reaction product of the asym-dichloroacetone and dimercaptan include but are not limited to materials represented by the following formula:

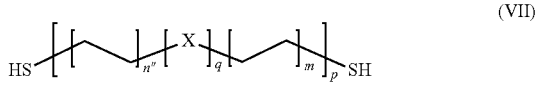

wherein X can represent O, S or Se, n" can be an integer from 0 to 10, m can be an integer from 0 to 10, p can be an integer from 1 to 10, q can be an integer from 0 to 3, and with the proviso that (m+n") is an integer from 1 to 20.

Non-limiting examples of suitable dimercaptoalkylsulfides for use in the present invention can include branched dimercaptoalkylsulfides.

The amount of dimercaptan, dimercaptoalkylsulfide, or mixtures thereof, suitable for reacting with the reaction product of asym-dichloroacetone and dimercaptan, can vary. Typically, dimercaptan, dimercaptoalkylsulfide, or a mixture thereof, can be present in the reaction mixture in an amount such that the equivalent ratio of reaction product to dimercaptan, dimercaptoalkylsulfide, or a mixture thereof, can be from 1:1.01 to 1:2. Moreover, suitable temperatures for carrying out this reaction can vary within the range of from 0 to 100° C.

The reaction of asym-dichloroacetone with dimercaptan can be carried out in the presence of an acid catalyst. The acid catalyst can be selected from a wide variety known in the art, such as but not limited to Lewis acids and Bronsted acids. Non-limiting examples of suitable acid catalysts can include those described in Ullmann's Encyclopedia of Industrial Chemistry, 5$^{th}$ Edition, 1992, Volume A21, pp. 673 to 674. The acid catalyst is often chosen from boron trifluoride etherate, hydrogen chloride, toluenesulfonic acid, and mixtures thereof. The amount of acid catalyst can vary from 0.01 to 10 percent by weight of the reaction mixture.

The reaction product of asym-dichloroacetone and dimercaptan can alternatively be reacted with dimercaptoalkylsulfide, dimercaptan or mixtures thereof, in the presence of a base. The base can be selected from a wide variety known in the art, such as but not limited to Lewis bases and Bronsted bases. Non-limiting examples of suitable bases can include those described in Ullmann's Encyclopedia of Industrial Chemistry, 5$^{th}$ Edition, 1992, Volume A21, pp. 673 to 674. The base is often sodium hydroxide. The amount of base can vary. Typically, a suitable equivalent ratio of base to reaction product of the first reaction, can be from 1:1 to 10:1.

The reaction of asym-dichloroacetone with dimercaptan can be carried out in the presence of a solvent. The solvent can be selected from but is not limited to organic solvents. Non-limiting examples of suitable solvents can include but are not limited to chloroform, dichloromethane, 1,2-dichloroethane, diethyl ether, benzene, toluene, acetic acid and mixtures thereof.

In another embodiment, the reaction product of asym-dichloroacetone and dimercaptan can be reacted with dimercaptoalkylsulfide, dimercaptan or mixtures thereof, in the presence of a solvent, wherein the solvent can be selected from but is not limited to organic solvents. Non-limiting examples of suitable organic solvents can include alcohols such as but not limited to methanol, ethanol and propanol; aromatic hydrocarbon solvents such as but not limited to benzene, toluene, xylene; ketones such as but not limited to methyl ethyl ketone; water; and mixtures thereof.

The amount of solvent can widely vary, from 0 to 99 percent by weight of the reaction mixtures. Alternatively, the reactions can be carried out neat, i.e., without solvent.

The reaction of asym-dichloroacetone with dimercaptan can also be carried out in the presence of a dehydrating reagent. The dehydrating reagent can be selected from a wide variety known in the art. Suitable dehydrating reagents for use in this reaction can include but are not limited to magnesium sulfate. The amount of dehydrating reagent can vary widely according to the stoichiometry of the dehydrating reaction.

The compound (a) having at least two thiol functional groups used to prepare the oligomeric polythiol used in certain embodiments of the present invention can be prepared in certain non-limiting embodiments by reacting 2-methyl-2-dichloromethyl-1,3-dithiolane with dimercaptodiethylsulfide to produce dimercapto-1,3-dithiolane derivative of formula III. Alternatively, 2-methyl-2-dichloromethyl-1,3-dithiolane can be reacted with 1,2-ethanedithiol to produce dimercapto-1,3-dithiolane derivative of formula II. 2-methyl-2-dichloromethyl-1,3-dithiane can be reacted with dimercaptodiethylsulfide to produce dimercapto-1,3-dithiane derivative of formula V. Also, 2-methyl-2-dichloromethyl-1,3-dithiane can be reacted with 1,2-ethanedithiol to produce dimercapto-1,3-dithiane derivative of formula IV.

Another non-limiting example of a dithiol suitable for use as compound (a) in the preparation of the oligomeric polythiol used in certain embodiments of the present invention can include at least one dithiol oligomer prepared by reacting dichloro derivative with dimercaptoalkylsulfide as follows in Reaction Scheme A:

Reaction Scheme A

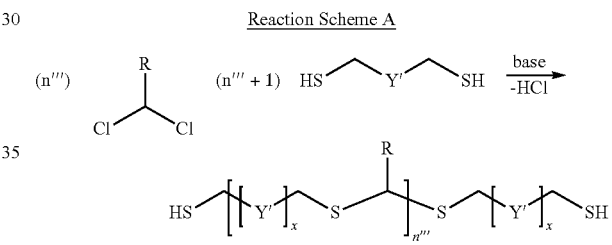

wherein R can represent $CH_3$, $CH_3CO$, $C_1$ to $C_{10}$ alkyl, cycloalkyl, aryl alkyl, or alkyl-CO; Y' can represent $C_1$ to $C_{10}$ alkyl, cycloalkyl, $C_6$ to $C_{14}$ aryl, $(CH_2)_{p'}(S)_{m'}(CH_2)_{q'}$, $(CH_2)_{p'}(Se)_{m'}(CH_2)_{q'}$, $(CH_2)_{p'}(Te)_{m'}(CH_2)_{q'}$, wherein m' can be an integer from 1 to 5 and, p' and q' can each be an integer from 1 to 10; n''' can be an integer from 1 to 20; and x can be an integer from 0 to 10.

The reaction of dichloro derivative with dimercaptoalkylsulfide can be carried out in the presence of a base. Suitable bases include any known to those skilled in the art in addition to those disclosed above.

The reaction of dichloro derivative with dimercaptoalkylsulfide may be carried out in the presence of a phase transfer catalyst. Suitable phase transfer catalysts for use in the present invention are known and varied. Non-limiting examples can include but are not limited to tetraalkylammonium salts and tetraalkylphosphonium salts. This reaction is often carried out in the presence of tetrabutylphosphonium bromide as phase transfer catalyst. The amount of phase transfer catalyst can vary widely, from 0 to 50 equivalent percent, or from 0 to 10 equivalent percent, or from 0 to 5 equivalent percent, relative to the dimercaptosulfide reactants.

The compound (a) having at least two thiol functional groups may further contain hydroxyl functionality. Non-limiting examples of suitable polythiol materials having hydroxyl groups can include but are not limited to glycerin bis(2-mercaptoacetate), glycerin bis(3-mercaptopropionate), 1,3-dimercapto-2-propanol, 2,3-dimercapto-1-propanol, trimethylolpropane bis(2-mercaptoacetate), trimethylolpropane bis(3-mercaptopropionate), pentaerythritol bis(2-mercaptoacetate), pentaerythritol tris(2-mercaptoacetate), pentaerythritol bis(3-mercaptopropionate), pentaerythritol tris(3-mercaptopropionate), and mixtures thereof.

In addition to dithiols disclosed above, particular examples of suitable dithiols for use as or in preparing the compound (a) can include 1,2-ethanedithiol, 1,2-propanedithiol, 1,3-propanedithiol, 1,3-butanedithiol, 1,4-butanedithiol, 2,3-butanedithiol, 1,3-pentanedithiol, 1,5-pentanedithiol, 1,6-hexanedithiol, 1,3-dimercapto-3-methylbutane, dipentenedimercaptan, ethylcyclohexyldithiol (ECHDT), dimercaptodiethylsulfide (DMDS), methyl-substituted dimercaptodiethylsulfide, dimethyl-substituted dimercaptodiethylsulfide, 3,6-dioxa-1,8-octanedithiol, 1,5-dimercapto-3-oxapentane, 2,5-dimercaptomethyl-1,4-dithiane (DMMD), ethylene glycol di(2-mercaptoacetate), ethylene glycol di(3-mercaptopropionate), and mixtures thereof.

Suitable trifunctional or higher-functional polythiols for use in compound (a) can be selected from a wide variety known in the art. Non-limiting examples can include pentaerythritol tetrakis(2-mercaptoacetate), pentaerythritol tetrakis(3-mercaptopropionate), trimethylolpropane tris(2-mercaptoacetate), trimethylolpropane tris(3-mercaptopropionate), and/or thioglycerol bis(2-mercaptoacetate).

For example, the polythiol can be chosen from materials represented by the following formula VIII,

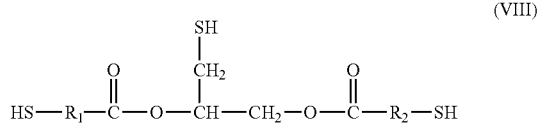

(VIII)

wherein $R_1$ and $R_2$ can each be independently chosen from straight or branched chain alkylene, cyclic alkylene, phenylene and $C_1$-$C_9$ alkyl substituted phenylene. Non-limiting examples of straight or branched chain alkylene can include but are not limited to methylene, ethylene, 1,3-propylene, 1,2-propylene, 1,4-butylene, 1,2-butylene, pentylene, hexylene, heptylene, octylene, nonylene, decylene, undecylene, octadecylene and icosylene. Non-limiting examples of cyclic alkylenes can include but are not limited to cyclopentylene, cyclohexylene, cycloheptylene, cyclooctylene, and alkyl-substituted derivatives thereof. The divalent linking groups $R_1$ and $R_2$ can be chosen from methylene, ethylene, phenylene, and alkyl-substituted phenylene, such as methyl, ethyl, propyl, isopropyl and nonyl substituted phenylene.

In particular embodiments, the compound (a) having at least two thiol functional groups may be prepared by reacting together (1) any of the dithiols mentioned above, and (2) a compound having at least two double bonds (for example, a diene). Such compounds having at least two double bonds are described in more detail below, as are reaction methods.

The compound (b) having triple bond functionality used to prepare the oligomeric polythiol used in the present invention may comprise any alkyne known to those skilled in the art. In certain embodiments, the alkyne comprises a hydroxyl functional alkyne, such as any of those known in the art. Because a triple bond can react twice with a thiol functional group, for the purposes of the present invention, a triple bond is understood to be equal to two equivalents of a double bond when determining reaction stoichiometry.

Suitable non-limiting examples of hydroxyl functional compounds having triple bond functionality include propargyl alcohol, 2-butyne-1,4-diol, 3-butyne-2-ol, 3-hexyne-2,5-diol, and/or mixtures thereof. A portion of the hydroxyl functional groups on the compound (b) may be esterified. For example, a portion of the compound (b) may comprise an alkyne-functional ester of a $C_1$-$C_{12}$ carboxylic acid such as propargyl acetate, propargyl propionate, propargyl benzoate, and the like.

In the preparation of the oligomeric polythiol used in certain embodiments of the present invention, the ratio of thiol functional groups in compound (a) to triple bonds in compound (b) typically ranges from 1.01:1 to 2.0:1, such as 1.5:1 to 2.0:1.

To prepare the oligomeric polythiols used in certain embodiments of the present invention, the reaction of the compound (a) with triple bond-containing compounds (b) can be carried out in the presence of radical initiator. Suitable radical initiators for use in the present invention can vary widely and can include those known to one of ordinary skill in the art. Non-limiting examples of radical initiators can include but are not limited to azo or peroxide type free-radical initiators such as azobisalkenenitriles. The free-radical initiator can be azobisalkenenitrile, which is commercially available from DuPont in their VAZO line. VAZO, VAZO-52, VAZO-64, VAZO-67, VAZO-88 and mixtures thereof can also be used as radical initiators, for example.

Selection of the free-radical initiator can depend on reaction temperature. The reaction temperature can vary, for example, from room temperature to 100° C. VAZO 52 can be used at a temperature of from 50-60° C. VAZO 64 and VAZO 67 can be used at a temperature of 60-70° C., and VAZO 88 can be used at a temperature of 70-100° C.

The amount of free radical initiator used in the reaction of the present invention can vary widely and can depend on the free radical initiator selected. Typically, the free radical initiator is present in an amount of from 0.01% by weight to 5% by weight of the reaction mixture.

The reaction of the compound (a) with the triple bond-containing compound (b) can be carried out under a variety of reaction conditions. Such conditions can depend on the degree of reactivity of the triple bond containing compound and the desired structure of the resulting polythiol oligomer. In one reaction scheme, the reactants and a radical initiator can be combined together while heating the mixture. Alternatively, the triple bond containing-compound can be added in relatively small amounts over a period of time to a mixture of polythiol and radical initiator at a certain temperature. Also, the triple bond containing-compound can be combined with the compound (a) having at least two thiol functional groups in a stepwise manner under radical initiation.

Certain embodiments of the present invention are directed to a sealant formulation comprising a thioether-functional, oligomeric polythiol prepared by reacting together:

(a) a compound having at least two thiol functional groups as described above;

(b) a compound having triple bond functionality as described above; and (c) a compound having at least two double bonds.

The compound (a) having at least two thiol functional groups may be any thioether-functional, oligomeric polythiols, including those described above. In certain embodiments, the compound (a) comprises a reaction product of (1) any of the dithiols mentioned above, and (2) a compound having at least two double bonds, which may be the same as or different from the compound (c). The compound (b) having triple bond functionality can be any such compound, including those described above. In certain embodiments, the compound having triple bond functionality will be a hydroxyl functional compound, so the polythiol will have pendant hydroxyl functional groups.

The compound (c) has at least two double bonds. Suitable compounds comprising two double bonds include but are not limited to non-cyclic dienes, including straight chain and/or branched aliphatic non-cyclic dienes, non-aromatic ring-containing dienes, including non-aromatic ring-containing dienes wherein the double bonds can be contained within the ring or not contained within the ring or any combination thereof, and wherein the non-aromatic ring-containing dienes can contain non-aromatic monocyclic groups or non-aromatic polycyclic groups or combinations thereof; aromatic ring-containing dienes; heterocyclic ring-containing dienes; and/or dienes containing any combination of such non-cyclic and/or cyclic groups. The dienes can optionally contain thioether, disulfide, polysulfide, sulfone, ester, thioester, carbonate, thiocarbonate, urethane, or thiourethane linkages, or halogen substituents, or combinations thereof; with the proviso that the dienes contain at least some double bonds capable of undergoing reaction with SH groups of a polythiol, and forming covalent C—S bonds. In certain embodiments the compound (c) having at least two double bonds comprises a mixture of dienes that are different from one another.

The compound (c) having at least two double bonds may comprise acyclic non-conjugated dienes, acyclic polyvinyl ethers, allyl-(meth)acrylates vinyl-(meth)acrylates, di(meth)acrylate esters of diols, di(meth)acrylate esters of dithiols, di(meth)acrylate esters of poly(alkyleneglycol) diols, monocyclic non-aromatic dienes, polycyclic non-aromatic dienes, aromatic ring-containing dienes, diallyl esters of aromatic ring dicarboxylic acids, divinyl esters of aromatic ring dicarboxylic acids, and/or mixtures thereof. "(Meth)acrylate" and like terms will be understood by those skilled in the art as referring to both methacrylate and the corresponding acrylate.

Non-limiting examples of acyclic non-conjugated dienes can include those represented by the following formula IX:

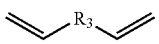
(IX)

wherein $R_3$ can represent $C_1$ to $C_{30}$ linear or branched divalent saturated alkylene radical, or $C_2$ to $C_{30}$ divalent organic radical including groups such as but not limited to those containing ether, thioether, ester, thioester, ketone, polysulfide, sulfone and combinations thereof. The acyclic non-conjugated dienes can be selected from 1,5-hexadiene, 1,6-heptadiene, 1,7-octadiene and mixtures thereof.

Non-limiting examples of suitable acyclic polyvinyl ethers can include those represented by the following formula X:

$$CH_2=CH-O-(-R_4-O-)_{m''}-CH=CH_2 \quad (X)$$

wherein $R_4$ can be $C_2$ to $C_6$ n-alkylene, $C_3$ to $C_6$ branched alkylene group, or $-[(CH_2-)_{p''}-O-]_{q''}-(-CH_2-)_{r'}-$, $m''$ can be a rational number from 0 to 10, often 2; $p''$ can be an integer from 2 to 6, $q''$ can be an integer from 1 to 5 and $r'$ can be an integer from 2 to 10.

Non-limiting examples of polyvinyl ether monomers suitable for use can include but are not limited to divinyl ether monomers, such as ethylene glycol divinyl ether, diethylene glycol divinyl ether, triethyleneglycol divinyl ether, and mixtures thereof.

Di(meth)acrylate esters of linear diols can include but are not limited to ethanediol di(meth)acrylate, 1,3-propanediol dimethacrylate, 1,2-propanediol di(meth)acrylate, 1,4-butanediol di(meth)acrylate, 1,3-butanediol di(meth)acrylate, 1,2-butanediol di(meth)acrylate, and mixtures thereof.

Di(meth)acrylate esters of dithiols can include but are not limited to di(meth)acrylate of 1,2-ethanedithiol including oligomers thereof, di(meth)acrylate of dimercaptodiethyl sulfide (2,2'-thioethanedithiol di(meth)acrylate) including oligomers thereof, di(meth)acrylate of 3,6-dioxa-1,8-octanedithiol including oligomers thereof, di(meth)acrylate of 2-mercaptoethyl ether including oligomers thereof, di(meth)acrylate of 4,4'-thiodibenzenethiol, and mixtures thereof.

Further non-limiting examples of suitable dienes can include but are not limited to monocyclic aliphatic dienes such as those represented by following graphic formula XI:

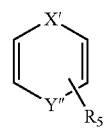
(XI)

wherein X' and Y" each independently can represent $C_{1-10}$ divalent saturated alkylene radical; or $C_{1-5}$ divalent saturated alkylene radical, containing at least one element selected from the group of sulfur, oxygen and silicon in addition to the carbon and hydrogen atoms; and $R_5$ can represent H, or $C_1$-$C_{10}$ alkyl; and those represented by the following graphic formula XII:

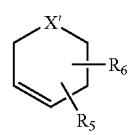
(XII)

wherein X' and $R_5$ can be as defined above and $R_6$ can represent $C_2$-$C_{10}$ alkenyl. The monocyclic aliphatic dienes can include 1,4-cyclohexadiene, 4-vinyl-1-cyclohexene, dipentene and terpinene.

Non-limiting examples of polycyclic aliphatic dienes can include but are not limited to 5-vinyl-2-norbornene; 2,5-norbornadiene; dicyclopentadiene and mixtures thereof.

Non-limiting examples of aromatic ring-containing dienes can include but are not limited to those represented by the following graphic formula XIII:

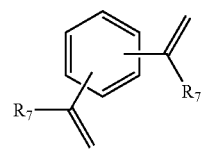
(XIII)

wherein R₇ can represent hydrogen or methyl. Aromatic ring-containing dienes can include monomers such as diisopropenyl benzene, divinyl benzene and mixtures thereof.

Examples of diallyl esters of aromatic ring dicarboxylic acids can include but are not limited to those represented by the following graphic formula XIV:

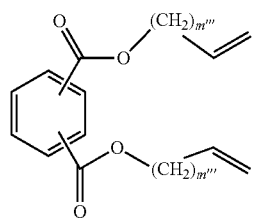

(XIV)

wherein each m''' independently can be an integer from 0 to 5. The diallyl esters of aromatic ring dicarboxylic acids can include o-diallyl phthalate, m-diallyl phthalate, p-diallyl phthalate and mixtures thereof.

In certain embodiments, the compound (c) having at least two double bonds comprises 5-vinyl-2-norbornene, ethylene glycol divinyl ether, diethylene glycol divinyl ether, triethylene glycol divinyl ether, butane diol divinyl ether, vinylcyclohexene, 4-vinyl-1-cyclohexene, dipentene, terpinene, dicyclopentadiene, cyclododecadiene, cyclooctadiene, 2-cyclopenten-1-yl-ether, 2,5-norbornadiene, divinylbenzene including but not limited to 1,3-divinylbenzene, 1,2-divinylbenzene, and/or 1,4-divinylbenzene, diisopropenylbenzene including but not limited to 1,3-diisopropenylbenzene, 1,2-diisopropenylbenzene, and/or 1,4-diisopropenylbenzene, allyl(meth)acrylate, ethanediol di(meth)acrylate, 1,3-propanediol di(meth)acrylate, 1,2-propanediol di(meth)acrylate, 1,3-butanediol di(meth)acrylate, 1,2-butanediol di(meth)acrylate, ethylene glycol di(meth)acrylate, diethylene glycol di(meth)acrylate, dimercaptodiethylsulfide di(meth)acrylate, 1,2-ethanedithiol di(meth)acrylate, and/or mixtures thereof.

Other non-limiting examples of suitable di(meth)acrylate monomers include but are not limited to ethylene glycol di(meth)acrylate, 1,3-butylene glycol di(meth)acrylate, 1,4-butanediol di(meth)acrylate, 2,3-dimethyl-1,3-propanediol di(meth)acrylate, 1,6-hexanediol di(meth)acrylate, propylene glycol di(meth)acrylate, dipropylene glycol di(meth)acrylate, tripropylene glycol di(meth)acrylate, tetrapropylene glycol di(meth)acrylate, ethoxylated hexanediol di(meth)acrylate, propoxylated hexanediol di(meth)acrylate, neopentyl glycol di(meth)acrylate, alkoxylated neopentyl glycol di(meth)acrylate, hexylene glycol di(meth)acrylate, diethylene glycol di(meth)acrylate, polyethylene glycol di(meth)acrylate, thiodiethyleneglycol di(meth)acrylate, trimethylene glycol di(meth)acrylate, triethylene glycol di(meth)acrylate, alkoxylated hexanediol di(meth)acrylate, alkoxylated neopentyl glycol di(meth)acrylate, pentanediol di(meth)acrylate, cyclohexane dimethanol di(meth)acrylate, and ethoxylated bis-phenol A di(meth)acrylate and/or mixtures thereof.

Polyfunctionalizing agents can also be used in preparing the polythiols, including but not limited to, trifunctionalizing agents, such a triallylcyanurate (TAC), trimethanol propane triallyl ether and triallyl triazine. Such trifunctionalizing agents can result in polymers having average functionalities of 2.05 to 3.0, such as 2.1 to 2.6. Wider ranges of average functionality can be achieved by using tetrafunctional or higher polyfunctionalizing agents. Use of polyfunctionalizing agents is described, for example, in U.S. Pat. No. 6,509,418, incorporated by reference herein.

In certain embodiments, compound (b) is reacted with a first diene prior to the reaction with compound (c). Any diene can be used for the first diene, including but not limited to those described herein. The first diene and compound (c) can be the same or different. In certain embodiments the first diene and/or compound (c) comprise a vinyl ether. "Vinyl ether" includes any compound comprising a vinyl ether moiety or derivative thereof including but not limited to those described herein. Particularly suitable are vinyl ether and diethylene glycol divinyl ether.

In the preparation of the oligomeric polythiol used in certain embodiments of the present invention, the reactants (a), (b), and (c) may all be reacted together simultaneously (as in a "one pot" process) or mixed together incrementally in various combinations. For example, compound (a) may be reacted first with the compound (b) having triple bond functionality as discussed above in a first reaction vessel to produce a first reaction product, followed by addition of the compound (c) having at least two double bonds to the reaction mixture to react with the first reaction product and yield the oligomeric polythiol of the present invention (or addition of the first reaction product to a second reaction vessel containing the compound (c)). As an alternative, the compound (a) may be reacted first with the compound (c) having at least two double bonds to produce a first reaction product, followed by addition of the compound (b) to yield the oligomeric polythiol. In this embodiment, one may optionally add, simultaneously with or after compound (b), an additional compound (c) having at least two double bonds, which may be the same as or different from that reacted earlier with compound (a) to form the first reaction product.

When the compound (a) is combined first with the compound (c), it is believed that they react via a thiol-ene type reaction of the SH groups of (a) with double bond groups of (c) although the inventors do not wish to be bound by this mechanism. Such reactions may typically take place in the presence of a radical initiator as mentioned above, or in the presence of a base catalyst, particularly when the compound (c) comprises a compound having at least one (meth)acrylate type double bonds. Suitable base catalysts for use in this reaction can vary widely and can be selected from those known in the art. Non-limiting examples can include tertiary amine bases such as 1,8-diazabicyclo[5.4.0]undec-7-ene (DBU) and N,N-dimethylbenzylamine. The amount of base catalyst used can vary widely, but typically it is present in an amount of from 0.001 to 5.0% by weight of the mixture of (a) and (c).

The stoichiometric ratio of the sum of the number of thiol equivalents of all polythiols present (compound (a)) to the sum of the number of equivalents of all double bonds present (including alkyne functionality effective as two double bond equivalents as discussed above) is typically greater than 1:1. In non-limiting embodiments, said ratio can be within the range of from greater than 1:1 to 3:1, or from 1.01:1 to 3:1, or from 1.01:1 to 2:1, or from 1.05:1 to 2:1, or from 1.1:1 to 1.5:1, or from 1.25:1 to 1.5:1.

Various methods of reacting polyvinyl ether monomers and one or more dithiol materials are described in detail in U.S. Pat. No. 6,509,418B1, column 4, line 52 through column 8, line 25, which disclosure is herein incorporated by reference. Various methods of reacting allyl sulfide and dimercaptodiethylsulfide are described in detail in WO 03/042270, page 2, line 16 to page 10, line 7, which disclosure is incorporated herein by reference. Various methods for reacting a dithiol and an aliphatic, ring-containing non-conjugated diene in the presence of free radical initiator are described in detail in WO/01/66623A1, from page 3, line 19 to page 6, line 11, the disclosure of which is incorporated herein by reference.

In reacting the compounds (a) and (c), it may be advantageous to use one or more free radical initiators. Non-limiting examples of suitable free radical initiators can include azo compounds, such as azobis-nitrile compounds such as but not limited to azo(bis)isobutyronitrile (AIBN); organic peroxides such as but not limited to benzoyl peroxide and t-butyl peroxide; inorganic peroxides and similar free-radical generators.

Alternately, the reaction of compounds (a) and (c) can be effected by irradiation with ultraviolet light either with or without a photoinitiating moiety.

The mixture of (a) and (c) can be reacted for a time period of from 1 hour to 5 days and at a temperature of from 20° C. to 100° C. Often, the mixture is heated until a predetermined theoretical value for SH content is achieved.

The stoichiometric ratio of the sum of the number of equivalents of triple bond functional groups in compound (b) to the sum of the number of equivalents of double bonds in compound (c) is often within the range of from 0.01:0.99 to 1.00:0, or from 0.10:0.90 to 1.00:0, or from 0.20:0.80 to 1.00:0.

As noted above, the sealant formulation further comprises a curing agent reactive with the thioether functional polythiol. Suitable curing agents include but are not limited to olefins, acrylates, metal oxides, epoxides and mixtures thereof as appropriate. It will be appreciated that the curing agent will react with the polythiol to result in a cured composition. Suitable epoxides include but are not limited to polyepoxides or epoxy functional resins, for example, hydantoin diepoxide, bisphenol-A epoxides, bisphenol-F epoxides, novolac-type epoxides, aliphatic polyepoxides, and any of the epoxidized unsaturated and phenolic resins. In certain embodiments, the majority of the epoxide, that is greater than 50%, greater than 70% or even greater than 90% is difunctional. It is believed that the difunctionality contributes to the elastomeric quality of the present compositions, although the inventors do not wish to be bound by any mechanism. Other useful curing agents include unsaturated compounds such as acrylic and methacrylic esters of commercially available polyols, unsaturated synthetic or naturally occurring resin compounds, TAC, and olefinic terminated derivatives of the present polythiols. In addition, useful cures can be obtained through oxidative coupling of the thiol groups using organic and inorganic peroxides (e.g., $MnO_2$) known to those skilled in the art. Selection of the particular curing agent may affect the $T_g$ of the cured composition. For example, curing agents that have a $T_g$ significantly lower than the $T_g$ of the polythioether may lower the $T_g$ of the cured composition.

The compositions of the present invention may comprise one or more ungelled thioether functional polythiols, as described above. It has surprisingly been discovered that polythioethers prepared according to the present invention result in ungelled polymers that are liquid at room temperature and pressure and that have desirable physical and/or rheological properties. The materials used herein also can be substantially free of deleterious catalyst residues, and have superior thermal resistance properties.

The present compositions find particular application in the aerospace industry, such as sealants and potting formulations. The sealant formulations described herein can be for glazing such as insulated glass, fuel tanks, and the like.

The polythiols described above, useful in the compositions of the present invention, can be liquid at room temperature and pressure and cured sealants including such polythiols can have excellent low temperature flexibility and/or fuel resistance. As used herein, the term "room temperature and pressure" denotes conditions of approximately 77° F. (25° C.) and 1 atmosphere (760 mm Hg) pressure.

The thioether functional polythiol is ungelled or substantially free of crosslinking. By "ungelled" is meant that the polythiol is substantially free of crosslinking and has an intrinsic viscosity when dissolved in a suitable solvent, as determined, for example, in accordance with ASTM-D1795 or ASTM-D4243. The intrinsic viscosity of the polythiol is an indication of its finite molecular weight. A gelled reaction product, on the other hand, since it is of essentially infinitely high molecular weight, will have an intrinsic viscosity too high to measure.

Low temperature flexibility can be determined by known methods, for example, by the methods described in AMS (Aerospace Material Specification) 3267 §4.5.4.7, MIL-S (Military Specification)-8802E §3.3.12 and MIL-S-29574, and by methods similar to those described in ASTM (American Society for Testing and Materials) D522-88, which are incorporated herein by reference. Cured formulations having good low temperature flexibility are desirable in aerospace applications because the formulations are subjected to wide variations in environmental conditions, such as temperature and pressure, and physical conditions such as joint contraction and expansion and vibration.

An advantage of the polythiols described above, when formulated into sealants and/or potting formulations, is that they exhibit very desirable fuel resistance characteristics when cured. The fuel resistance of a cured sealant can be determined by percent volume swell after prolonged exposure of the cured sealant to hydrocarbon fuel, which can be quantitatively determined using methods similar to those described in ASTM D792 or AMS 3269, which are incorporated herein by reference. For fuel resistance testing, the cured sealant can be prepared from 100 parts by weight of polythiol, 50 parts by weight of precipitated calcium carbonate and an epoxy curing agent in a 1:1 equivalent ratio of mercapto groups to epoxy groups. The epoxy curing agent is prepared from a 60:40 weight ratio of EPON 828 bisphenol A diglycidyl ether (available from Shell Chemical) to DEN 431 bisphenol A novolac resin (available from Dow Chemical).

In certain embodiments, the cured sealants of the present invention have a percent volume swell not greater than 40%, such as not greater than 25%, after immersion for one week at 140° F. (60° C.) and ambient pressure in jet reference fluid (JRF) type 1. In certain embodiments, the percent volume swell of the cured polymers is not greater than 20%, and may range from zero to 20%. Jet reference fluid JRF type 1, as employed herein for determination of fuel resistance, has the following composition (see AMS 2629, issued Jul. 1, 1989), §3.1.1 et seq., available from SAE (Society of Automotive Engineers, Warrendale, Pa.) (that is incorporated herein by reference):

| | |
|---|---|
| Toluene | 28 ± 1% by volume |
| Cyclohexane (technical) | 34 ± 1% by volume |
| Isooctane | 38 ± 1% by volume |
| Tertiary dibutyl disulfide (doctor sweet) | 1 ± 1% by volume |
| Tertiary butyl mercaptan | 0.015% ± 0.0015 by weight of the other four components |

The polythiol can comprise, for example, 30 to 90 weight percent of the sealant or potting formulation on a basis of total weight of the sealant or potting formulation, such as 30 to 60 weight percent.

Depending on the nature of the polythiol used in the composition, the composition can comprise about 90% to about 150% of the stoichiometric amount of the selected curing agent(s) based upon —SH equivalents, such as about 95 to about 125%.

Fillers useful in the compositions of the invention for aerospace application include those commonly used in the art, such as carbon black, calcium carbonate ($CaCO_3$), silica, nylon, microspheres and the like. Potting compound fillers illustratively include but are not limited to high band gap materials such as zinc sulfide and inorganic barium compounds. Other suitable fillers may include those used to impart electrical conductivity and/or electromagnetic interference/radio frequency interference (EMI/RFI) shielding effectiveness are well known in the art. Examples of suitable fillers include but are not limited to electrically conductive noble metal-based fillers such as pure silver; noble metal-plated noble metals such as silver-plated gold; noble metal-plated non-noble metals such as silver plated copper, nickel or aluminum, for example, silver-plated aluminum core particles or platinum-plated copper particles; noble-metal plated glass, plastic or ceramics such as silver-plated glass microspheres, noble-metal plated aluminum or noble-metal plated plastic microspheres; noble-metal plated mica; and other such noble-metal conductive fillers. Non-noble metal based materials can also be suitable including, for example, non-noble metal-plated non-noble metals such as copper-coated iron particles or nickel plated copper; non-noble metals, e.g. copper, aluminum, nickel, cobalt; non-noble-metal-plated-non metals, e.g., nickel-plated graphite and non-metal materials such as carbon black and graphite. The compositions may include about 10 to about 70 wt % of the selected filler or combination of fillers, such as about 10 to 50 wt % based upon the total weight of the composition.

The compositions of the present invention can comprise one or more adhesion promoters. Suitable adhesion promoters include phenolics such as METHYLON phenolic resin available from Occidental Chemicals, organosilanes such as epoxy, mercapto or amino functional silanes such as A-187 and A-1100 available from OSi Specialties. An adhesion promoter, if used, can be employed in an amount from 0.1 to 15 wt % based upon total weight of the formulation.

Common substrates to which the present compositions of the present inventions are applied can include titanium, stainless steel, aluminum, anodized, primed, organic coated and chromate coated forms thereof, epoxy, urethane, graphite, fiberglass, composite, KEVLAR, acrylics, glass and polycarbonates.

A plasticizer may be present in the compositions of the invention in an amount ranging from 1 to 8 weight percent based upon total weight of the formulation. Plasticizers that are useful include phthalate esters, chlorinated paraffins, hydrogenated terphenyls, etc.

The present compositions can further comprise one or more organic solvents, such as isopropyl alcohol, in an amount ranging from 0 to 15 percent by weight on a basis of total weight of the formulation, such as less than 15 percent or less than 10 weight percent.

Polymerizable composition cure time can be reduced considerably by using an organic amine catalyst having a pKb of 10 or above. Suitable organic amine catalysts are organic tertiary amines. Specific catalysts that are useful in the present invention are triethylene diamine, diazabicyclo (2,2,2) octane (DABCO), diazabicycloundecene (DBU), 2,4,6-tri (dimethylamino methyl)phenol (DMP-30) and tetramethyl guanidine (TMG). The reaction time when utilizing the organic amine catalysts, and particularly the organic tertiary amine catalysts, is in general between about one hour to about 20 hours, which is a considerable difference compared to using no amine catalyst.

Generally the amount of catalyst ranges from 0.05 wt % to 3 wt %, based on the total weight of the starting reactants.

The sealant or potting formulations of the present invention can be cured at ambient temperature and pressure, however the formulations generally can be cured at a temperature ranging from about 0° C. to about 100° C.

In addition to the ingredients discussed above, the compositions of the invention can optionally include one or more of the following: pigments, thixotropes; retardants; and masking agents.

Useful pigments include those conventional in the art, such as carbon black and metal oxides. Pigments can be present in an amount from 0.1 to 10 wt % based upon total weight of the formulation.

Thixotropes, for example fumed silica or carbon black, can be used in an amount from 0.1 to 5 wt % based upon total weight of the formulation.

A particularly suitable curable sealant formulation combines one or more plasticizers with the polythiol(s), curing agent(s) and filler(s) described above. Use of a plasticizer allows the polymerizable formulation to include polythiols(s) that have higher $T_g$ than would ordinarily be useful in an aerospace sealant or potting compound, i.e., use of a plasticizer effectively reduces the $T_g$ of the formulation, and thus increases the low-temperature flexibility of the cured polymerizable formulation beyond that which would be expected on the basis of the $T_g$ of the mercapto-terminated polymers alone. In certain embodiments, the present compositions have a $T_g$ of –30° C. or less.

As used herein, unless otherwise expressly specified, all numbers such as those expressing values, ranges, amounts or percentages may be read as if prefaced by the word "about", even if the term does not expressly appear. Any numerical range recited herein is intended to include all sub-ranges subsumed therein. Plural encompasses singular and vice versa. "Including" and like terms are open ended; that is, they mean "including but not limited to". For example, although reference is made herein including the claims to "a" compound having at least two thiol functional groups, "a" dithiol, "a" polythiol, "a" compound having triple bond functionality, "a" curing agent, "an" epoxide, "a" compound having at least one double bond, "a" filler, "an" adhesion promoter, "a" plasticizer, "a" catalyst, a mixture of any of these can be used. As used herein, the term "polymer" is meant to refer to prepolymers, oligomers and both homopolymers and copolymers; the prefix "poly" refers to two or more.

The present invention is illustrated in more detail by means of the following non-limiting examples which are presently representative of preferred embodiments. These examples are exemplary and are not intended as a limitation on the scope of the invention as detailed in the appended claims.

EXAMPLES

The following examples are intended to illustrate the invention and should not be construed as limiting the invention in any way.

In the following examples, unless otherwise stated, the refractive index and Abbe number were measured on a multiple wavelength Abbe Refractometer Model DR-M2 manufactured by ATAGO Co., Ltd.; the refractive index and Abbe number of liquids were measured in accordance with ASTM-D1218; the refractive index and Abbe number of solids was measured in accordance with ASTM-D-542.

The viscosity was measured using a Brookfield CAP 2000+ Viscometer.

The cured resins were evaluated for volume swell and weight gain after 1 week at room temperature in JRF type1 as followed:

w1=initial weight in air
w2=initial weight in $H_2O$
w3=final weight in air
w4=final weight in $H_2O$
% volume swell=100((w2+w3)−(w1+w4))/(w1−w2)
% weight gain=100(w3−w1)/w1

The SH groups within the product were determined using the following procedure. A sample size (0.1 mg) of the product was combined with 50 mL of tetrahydrofuran (THF)/propylene glycol (80/20) and stirred at room temperature until the sample was substantially dissolved. While stirring, 25.0 mL of 0.1 N iodine solution (which was commercially obtained from Aldrich 31, 8898-1) was added to the mixture and then allowed to react for a time period of from 5 to 10 minutes. To this mixture was added 2.0 mL concentrated HC1. The mixture was then titrated potentiometrically with 0.1 N sodium thiosulfate in the millivolt (mV) mode. A blank value was initially obtained by titrating 25.0 mL iodine (including 1 mL of concentrated hydrochloric acid) with sodium thiosulfate in the same manner as conducted with the product sample.

$$\% \ SH = \frac{(\text{mls Blank} - \text{mls Sample}) \times (\text{Normality } NA_2S_2O_3) \times (3.307)}{\text{Sample weight, g}}$$

Example 1

Synthesis of 2/1 (mol/mol) Adduct of Dimercaptodiethylsulfide (DMDS) and Propargyl Alcohol (PA)

In a glass jar with a magnetic stirrer were mixed DMDS from Nisso Maruzen, Japan, 154.0 g. (1.0 mol) and PA from Aldrich, 28.0 g. (0.5 mol) at room temperature. Then this mixture was heated up to 60° C. using an oil bath. The mixture was kept at this temperature while stirring for 30 min. An exothermic reaction started to take place, leading to an increase in the temperature of the reaction mixture to 80° C. for a short period of time. This exothermic reaction was over after 30 minutes and the reaction temperature went down to 60° C., the temperature of the heating bath. Radical initiator VAZO[1] 64, 50 mg., 275 ppm was added three times at intervals of 5 hours while the mixture was stirred at 60° C. The equivalent weight of the product was 181.5 g/equiv (theoretical 182 g/equiv), based on an Mn=363. VAZO 64, 50 mg., 275 ppm was added again and the mixture was heated at 60° C. upon stirring for another 5 hours. The equivalent weight measurement showed no changes and the reaction was considered completed. The viscosity of the materials was 258 cPs (25° C.), nD=1.627, Abbe 36, nE=1.631, Abbe 36. The yield was quantitative.

[1] Available from DuPont.

Example 2

Synthesis of 2/1 (mol/mol) Adduct of (DMDS) and 1,3-Diisopropenyl benzene (DIPEB)

524.6 g DMDS (3.4 mol) were charged to a glass jar, and the contents were heated to 60° C. To the jar was slowly added 269.0 g DIPEB (1.7 mol) with mixing. Once the addition of DIPEB was completed, the jar was placed in an oven heated to 60° C. for 2 hours. Afterwards, 0.1 g VAZO 52 was dissolved into the contents of the jar, and the jar was returned to the oven. After 20 hours, the resulting sample was titrated for —SH equivalents and was found to have an equivalent weight of 145 g/mol. 0.1 g VAZO 52 was dissolved into the reaction mixture, which was then returned to the oven. Over the course of 8 hours, two additions of 0.2 g VAZO 52 were made, and the reaction mixture kept in the 60° C. oven over that time frame. 17 hours after the final addition of VAZO 52 was made, the resulting sample was titrated to an equivalent weight of 238 g/equiv (theoretical 233 g/equivalent). The viscosity of the material at 25° C. was measured and found to be 490 cPs. The yield was quantitative.

Example 3

Synthesis of 2/1 (mol/mol) Adduct of the Polythiol of Example 2 and PA

Polythiol B (prepared according to Example 2) 200.0 g. (0.42 mol) and PA, 11.6 g. (0.21 mol) were mixed at room temperature. Then this mixture was heated up to 65° C. Radical initiator VAZO 52, 42 mg, 200 ppm was added three times at intervals of 5 hours while the mixture was stirred at 65° C. The SH equivalent weight was determined to be 499 g/equiv. The mixture was heated at 65° C. for another 5 hours and the SH equivalent weight was measured again, and determined to be 499 g/equiv, based on an Mn=998. The viscosity of the mixture was 463 cPs (73° C.), nD=1.620, Abbe 36, nE=1.624, Abbe 35. The yield was quantitative.

Example 4

A thiol functional resin was prepared as described below: Triallylcyanurate acid (1.99 g), the polythiol of Example 1 (211.78 g) and diethyleneglycol divinylether (79.1 g) were combined and warmed to 80° C. then held 20 minutes. VAZO 67 (1.08 g) was then added over 20 minutes. The reaction was held at 80° C. for four hours then sampled for thiol equivalent weight. The product had a thiol equivalent weight of 1975 g/eq. and Mw of 13088 as measured by gel permeation chromatography.

Example 5

A thiol functional resin was prepared as described below: Triallylcyanurate acid (1.65 g), the polythiol of Example 3 (326.70 g) and diethyleneglycol divinylether (65.9 g) were combined and warmed to 80° C. then held 15 minutes. VAZO 67 (2.00 g) was then added over 45 minutes. The reaction was held at 80° C. for three hours then sampled for thiol equivalent weight. The product had a thiol equivalent weight of 5489 g/eq. and Mw of 23141 as measured by gel permeation chromatography.

Example 6

Patent Example 4 (94.9 g) was warmed to 160° F. and then added to a pre-blended epoxy mixture (8.33 g) composed of 30% DEN431[2] and 70% EPON 828[3] and mixed while adding two drops of DABCO 33LV[4] amine catalyst. The mixture was poured into a polypropylene cup lid ⅛ inch deep and allowed to cure one day at room temperature then two days at 140° F.

[2]DEN431 is an epoxy Novolac, available from Dow.
[3]EPON 828 is a bisphenol A epichlorohydrin epoxy, available from Shell.
[4] DABCO 33LV, available from Air Products.

Example 7

Patent Example 5 (45.8 g) was warmed to 160° F. and then added to EPON 828 (1.48 g) and mixed while adding two drops of DABCO 33LV amine catalyst. The mixture was poured into a polypropylene cup lid ⅛ inch deep and allowed to cure one day at room temperature then two days at 140° F.

Example 8

Patent Example 4 (39.8 g) was warmed to 160° F. and then added to EPON 828 (3.57 g) and mixed while adding two drops of DABCO 33LV amine catalyst. The mixture was poured into a polypropylene cup lid ⅛ inch deep and allowed to cure one day at room temperature then two days at 140° F.

Example 9

Patent Example 3 (57.48 g) was added to a pre-blended epoxy mixture (40.0 g) composed of 22.4% DEN431, 51.8% EPON 828 and 25.8% calcium carbonate and mixed while adding fifteen drops of DABCO 33LV amine catalyst. The mixture was poured into a polypropylene cup lid ⅛ inch deep and allowed to cure one day at room temperature then two days at 140° F.

Example 10

Patent Example 1 (43.63 g) was added to a pre-blended epoxy mixture (57.00 g) composed of 22.4% DEN431, 51.8% EPON 828 and 25.8% calcium carbonate and mixed while adding three drops of DABCO 33LV amine catalyst. The mixture was poured into a polypropylene cup lid ⅛ inch deep and allowed to cure one day at room temperature then two days at 140° F.

Example 11

The compositions prepared according to Examples 6-10 were tested as indicated below.

| Cured Resin | Ex 6 | Ex 7 | Ex 8 | Ex 9 | Ex 10 |
|---|---|---|---|---|---|
| $T_g$(° C.) | −38 | −36 | −38 | −5 | 2 |
| % fuel swell | 2.72 | 2.05 | 2.67 | 2.61 | 0.25 |
| % weight gain | 1.35 | 1.47 | 3.11 | 0.71 | 0.39 |

What is claimed is:

1. A sealant formulation comprising:
   1) a thioether-functional oligomeric polythiol comprising a reaction product of at least:
      a) a compound having at least two thiol functional groups; and
      b) a compound having triple bond functionality and hydroxyl functionality;
   2) a curing agent reactive with the thioether-functional oligomeric polythiol; and
   3) a filler, an adhesion promoter, a plasticizer and/or a catalyst.

2. The formulation of claim 1, wherein compound (a) having at least two thiol functional groups comprises a dithiol.

3. The formulation of claim 1, wherein compound (a) having at least two thiol functional groups comprises a dithiol and a compound having more than two thiol functional groups.

4. The formulation of claim 1, wherein compound (a) comprises hydroxyl functionality.

5. The formulation of claim 1, wherein compound (b) having triple bond functionality comprises propargyl alcohol, propargyl chloride, propargyl bromide, propargyl acetate, propargyl propionate, propargyl benzoate, phenyl acetylene, phenyl propargyl sulfide, 1,4-dichloro-2-butyne, 2-butyne-1, 4-diol, 3-butyne-2-1,2-pentyne, 1-hexyne, 2-hexyne, 3-hexyne, 3-hexyne-2,5-diol, and/or mixtures thereof.

6. The formulation of claim 1, wherein the curing agent comprises an epoxide.

7. The formulation of claim 6, wherein the epoxide comprises a bisphenol A epoxide and/or a novolac-type epoxide and/or a hydantoin epoxy.

8. A formulation of claim 1, wherein the $T_g$ of the sealant is −30° C. or less.

9. The formulation of claim 1, further comprising an amine catalyst.

10. The formulation of claim 1, wherein the thioether-functional oligomeric polythiol reaction product comprises a reaction product of at least:
    the reaction product of a) and b); and
    c) a compound having at least two double bonds.

11. The formulation of claim 10, wherein the compound (c) having at least two double bonds comprises an acyclic non-conjugated diene, an acyclic polyvinyl ether, an allyl-(meth)acrylate, a vinyl-(meth)acrylate, a di(meth)acrylate ester of diol, a di(meth)acrylate ester of dithiol, a di(meth)acrylate ester of poly(alkyleneglycol) diol, a monocyclic non-aromatic diene, a polycyclic non-aromatic diene, an aromatic ring-containing diene, a diallyl ester of aromatic ring dicarboxylic acid, a divinyl ester of aromatic ring dicarboxylic acid, and/or mixtures thereof.

12. The formulation of claim 10, wherein the compound (c) having at least two double bonds comprises 5-vinyl-2-norbornene, ethylene glycol divinyl ether, diethylene glycol divinyl ether, triethylene glycol divinyl ether, butane diol divinyl ether, vinylcyclohexene, 4-vinyl-1-cyclohexene, dipentene, terpinene, dicyclopentadiene, cyclododecadiene, cyclooctadiene, 2-cyclopenten-1-yl-ether, 2,5-norbornadiene, divinylbenzene, diisopropenylbenzene, allyl (meth)acrylate, ethanediol di(meth)acrylate, 1,3-propanediol di(meth)acrylate, 1,2-propanediol di(meth)acrylate, 1,4-butanediol di(meth)acrylate, 1,3-butanediol di(meth)acrylate, 1,2-butanediol di(meth)acrylate, ethylene glycol di(meth)acrylate, diethylene glycol di(meth)acrylate, 2,2'-thioethanedithiol di(meth)acrylate, 1,2-ethanedithiol di(meth)acrylate, and/or mixtures thereof.

13. The formulation of claim 10, wherein compound (b) is reacted with a first diene prior to reaction with compound (c), and wherein the first diene is the same or different from compound (c).

14. The formulation of claim 13, wherein the first diene and/or compound (c) comprise a vinyl ether.

15. A sealant formulation comprising:
1) a thioether-functional oligomeric polythiol comprising a reaction product of
   a) a compound having more than two thiol functional groups wherein at least two of the thiol functional groups are terminal thiol functional groups; and
   b) a compound having triple bond functionality and hydroxyl functionality;
2) a curing agent reactive with the thioether-functional oligomeric polythiol; and
3) a filler, an adhesion promoter, a plasticizer and/or a catalyst.

16. An electrical potting formulation comprising:
1) a thioether-functional oligomeric polythiol comprising a reaction product of
   a) a compound having at least two thiol functional groups; and
   b) a compound having triple bond functionality and hydroxyl functionality;
2) a curing agent reactive with the thioether-functional oligomeric polythiol; and
3) a filler, an adhesion promoter, a plasticizer and/or a catalyst, wherein the $T_g$ of the formulation is $-30°$ C. or less.

* * * * *